May 29, 1923.
J. C. BOCK ET AL
1,456,964
COMBINED COLORIMETER NEPHELOMETER
Filed June 26, 1918
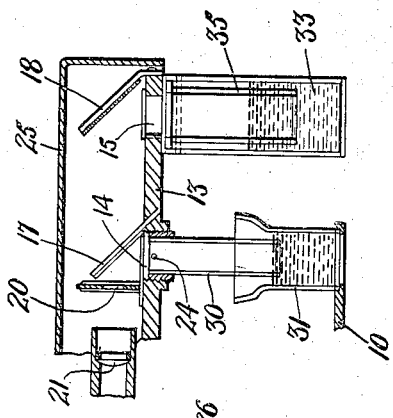
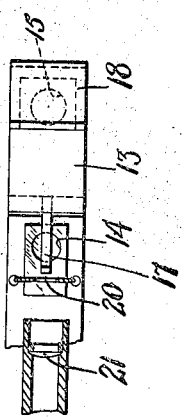
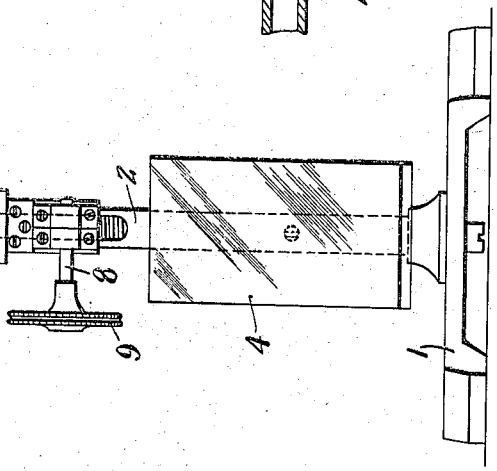
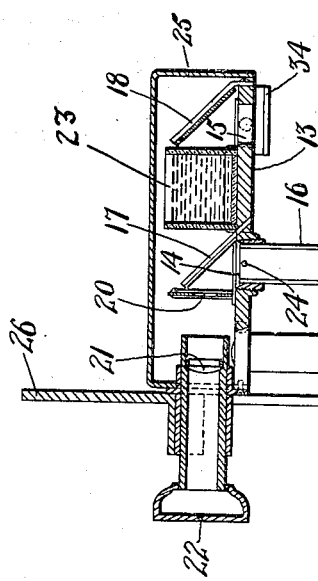
Joseph C. Bock, Inventors
Stanley R. Benedict,
By their Attorney

Patented May 29, 1923.

UNITED STATES PATENT OFFICE.

1,456,964

JOSEPH C. BOCK, OF BROOKLYN, AND STANLEY R. BENEDICT, OF NEW YORK, N. Y.

COMBINED COLORIMETER NEPHELOMETER.

Application filed June 26, 1918. Serial No. 241,937.

*To all whom it may concern:*

Be it known that we, JOSEPH C. BOCK and STANLEY R. BENEDICT, citizens of the United States, and residents of Brooklyn, county of Kings, and State of New York, and New York city, county and State of New York, respectively, have invented certain new and useful Improvements in Combined Colorimeter Nephelometers, of which the following is a specification.

This invention relates to a combined colorimeter-nephelometer apparatus whereby two colored solutions can be compared either by the transmission of light directly through the two solutions as in a colorimeter, or by means of reflecting light from particles in the two solutions, as in a nephelometer.

The object of this invention is to provide an apparatus of this character which will be simple in operation and much cheaper to construct than apparatus of this character now available. A characteristic feature of this invention for both colorimetry and nephelometry resides in the combination with a single eye piece in front of the diaphragm of parallel laterally displaced mirrors behind the diaphragm, one mirror reflecting rays from one solution to the eye piece and the other mirror reflecting the rays from the other solution outside of the rays from the first mirror but through the same diaphragm opening to the eye piece. For both colorimetry and nephelometry there will be provided below one of the mirrors an adjustable plunger and cup for one solution, the other solution in the case of a colorimeter being in a rectangular transparent cup between the two mirrors, while for nephelometry, this rectangular cup will be replaced by an ordinary nephelometric cup and plunger disposed below the second mirror. For colorimetry, the adjustable plunger and cup may have transparent sides as well as bottom, since the light comes from below upward, but for nephelometry, the light will come from the side into each cup, so that the cups will have opaque bottoms and the sides of the plungers will be opaque, so that the length of solution will be that between the bottom of the plunger and the bottom of the cup.

In the accompanying drawings,

Figure 1 is an elevation of a colorimeter embodying the invention,

Figure 2 is an end view,

Figure 3 is a detail view showing the arrangement for a nephelometer, and

Figure 4 shows a modification.

1 represents a base having an upright 2 provided with a rod 3 on which telescopes an adjustable collecting mirror 4, having preferably a ground glass surface so as not to reflect images of surrounding objects. Mounted to slide on the rectangular upright 2 is a sleeve 5 carrying a vernier 6 which moves over a scale marked on the side of the upright 2, the support 2 carrying a rack 7 which is engaged by a pinion on the end of shaft 8 operated by hand wheel 9, mounted on the sleeve 5. The sleeve 5 also carries a platform 10 having an opening 11 to receive a cup 12. Mounted at the top of the support 2 is a platform 13 having apertures 14, 15 therein. Threaded in the platform 13 so as to be vertically adjustable is a glass plunger 16 having a closed transparent bottom. Above the aperture 14, which is covered by a thin glass slide, is a mirror 17, which is made as near as possible a first surface mirror, that is one silvered on as thin a support as is obtainable in order to prevent double reflection. The very thin slides used in microscopy have been found satisfactory for this purpose. The mirror 17 slides in and out of a slot cut in platform 13, so as to be adjustable transversely, or removable. Above the aperture 15 is a similar mirror 18, which is parallel to and at one side of mirror 17, so that both mirrors reflect parallel rays through the diaphragm 20 and objective 21 to the eye piece 22. The objective 21 is preferably at a fixed focal distance from the eye piece 22, and the latter telescopes in and out of the supporting tube for adjustment. The diaphragm 20 has its opening preferably round, and the mirror 17 is so adjusted as to cover one-half of the diaphragm, while the mirror 18 covers the other half. Between the two mirrors is placed a rectangular cup 23 having parallel transparent sides for containing the standard solution in colorimetry. With each instrument one or more cups may be provided, one being for example 15 x 20 millimeters, and the other 8 x 10 millimeters, so that by putting these cups in two positions in the path of rays from mirror 18, four standards can be obtained, each standard being comprised by the length of solution between the parallel sides of the cup 23. The purpose of providing two known layer thicknesses, either of which may be made available for comparison, is to extend the range of the instrument. The upper straight edge of mirror 18 furnishes a convenient guide for lining up the cup 23. 24 is a set-screw for holding the plunger 16 in adjusted position, 25 is a detachable cover, and 26 is a shield frictionally mounted on the eye piece supporting tube.

In operation, the cup 23 will be filled with the standard solution, and the cup 12 with the solution to be measured. Before putting solution in cup 12, the zero point will be ascertained by bringing the vernier 6 to zero on the scale and then screwing the plunger 16 down until it touches the bottom of cup 12. Then by putting the solution to be measured in cup 12, it will be lowered until the intensity of field seen through the eye piece 22 is just alike on each side, the position of vernier on the scale then furnishing the ratio between the unknown solution between the bottom of cup 12 and the bottom of plunger 16 to the known solution in cup 23.

For nephelometry, the cup 23 is removed and a plunger 30 having opaque sides is substituted for plunger 16 and a cup 31 having an opaque bottom is substituted for the cup 12. Instead of the cup 23 between the mirrors 17 and 18, a standard solution cup 33 having transparent sides and opaque bottom is slid into position below opening 15 on guides 34. Within the cup 33 is a plunger 35 similar to plunger 30, and likewise having opaque sides, the distance between the bottom of plunger 35 and the bottom of cup 33 being known so as to constitute the standard.

In operation, the light is reflected against the sides of both cups 31, 33 and is thence reflected by the particles in suspension to the mirrors 17 and 18 and thence through the diaphragm 20 to the eye piece, the degree of color of solution in cup 31 being read off on the scale after the vernier has been adjusted to zero with the plunger 30 against the bottom of cup 31 and without any solution in cup 31.

Figure 4 shows a modification applicable to both colorimetry and nephelometry, and differing from the previous form in having the mirror 17 narrow so as to stand midway of the diaphragm and the mirror 18. This gives three fields and is somewhat better for fine work, in that the middle field representing one color has on each side a field representing the other color. The narrow mirror 17 slides in the same slot, in the same manner, as the wide mirror.

Various changes and modifications may be made in the details and arrangement without departing from the scope of the appended claims.

What is claimed, is:

1. A stand carrying a cup and a flat bottom plunger, a mirror above the plunger for reflecting rays from the plunger horizontally, a diaphragm adjacent said mirror having a portion of its opening outside the rays from said plunger mirror, a rectangular cup for a standard solution, means for supporting the rectangular cup located in line with the portion of said diaphragm not covered by said plunger mirror, a second mirror beyond said first mirror for reflecting rays through said diaphragm parallel to the rays reflected from the cup and plunger, and an eye piece for receiving the rays from both mirrors.

2. A stand carrying a vertically adjustable cup and a plunger, a mirror above the plunger for reflecting rays from the plunger horizontally, a diaphragm adjacent said mirror having a portion of its opening outside the rays from said plunger mirror, means for supporting a standard solution located in line with the portion of said diaphragm not covered by said plunger mirror, a second mirror beyond said first mirror for reflecting rays through said diaphragm parallel to the rays reflected from the cup and plunger, and an eye piece for receiving the rays from both mirrors.

3. A color comparing apparatus comprising a cup and a flat bottom plunger, means for directing light from the cup upwardly through the plunger, a mirror above the plunger for deflecting said rays to an eye piece, a diaphragm having an opening beyond and partly covered by said mirror, a second mirror behind and laterally of said first mirror for reflecting rays to the eye piece through the portion of said diaphragm opening not covered by said first mirror, a rectangular cup in the path of said last mentioned rays, each of said cups adapted to contain a color solution one of which is a standard, an eyepiece receiving both sets of rays, and means for comparing the effective lengths of the two solutions.

4. A color comparing device comprising a cup, a flat bottom plunger, a mirror above the plunger, a diaphragm having an opening to receive through a portion of said opening rays reflected by the mirror after passing through the cup and plunger, a second mirror laterally of and beyond said first mirror for reflecting a second set of rays through said diaphragm opening, a standard solution confined between parallel surfaces in the path of said second rays and behind the first mirror, and an eye piece for receiving the rays from both mirrors.

5. A colorimeter comprising a cup adapted to receive a solution to be tested, a relatively movable plunger in said cup, a mirror above the plunger for reflecting the rays laterally, a diaphragm having an opening partly overlapped by said mirror, a second mirror parallel to and laterally behind the first mirror to reflect a second set of rays through the portion of the diaphragm not covered by said first mirror, a parallel sided transparent cup for a second solution between said mirrors, and an eye piece behind the diaphragm receiving both sets of rays.

6. In a color comparing device the combination with an eye piece, of a pair of reflectors for simultaneous cooperation with said eye piece, one of the reflectors being intermediate the other reflector and the eye piece, a liquid container between said reflectors, another liquid container below said first mentioned or intermediate reflector, and means for directing light rays through each of the liquid containers and into the eye piece.

7. In a color comparing device the combination with an eye piece, of a pair of reflectors for simultaneous cooperation with said eye piece, a support for a liquid container located intermediate one of the reflectors and the eye piece, and another support for a liquid container located beneath said same reflector, and a third support and a liquid container mounted thereon below said other reflector, and means for directing light rays through said support and through a liquid container located on either of the first two mentioned supports.

8. A color comparing device comprising a single eyepiece for receiving two parallel horizontal rays of light, a transparent oblong rectangular container for a standard solution, adapted to be interposed in either crosswise or lengthwise position in the path of one of said light rays with its entrance and exit surfaces normal thereto, so as to provide two different standards of color absorption according to its position, an adjustable cup for containing unknown solution, a mirror for directing vertical rays therefrom to said eyepiece in a direction parallel to and displaced from the rays through said standard solution container, a common light source for both sets of rays, and means for directing the light from said source to each of said solutions.

9. In a color comparing apparatus, means for reflecting rays to a monocular eyepiece from known and unknown solutions, parallel surfaces confining the solutions traversed by the said rays, the parallel surfaces for one of said solutions being fixed and the parallel surfaces of the other solution being movable and means for measuring the distance between the said movable parallel surfaces.

10. In a color comparing device, an eye piece and reflector therefor, a liquid container and plunger arranged to have light rays pass through them to the reflector and eye piece, means for moving one of them to vary the separation between the container and plunger and change the effective thickness of liquid through which the light passes, said means comprising an indicating scale, and means for moving the other of them to adjust the zero of said scale.

11. A color comparing device comprising a supporting platform, an eye piece above said platform and directed longitudinally thereof, a pair of reflectors supported over said platform and adapted to simultaneously reflect light rays into said eye piece, one of said reflectors being between the other reflector and the eye piece, a liquid container on said platform between one of said reflectors and the eye piece, apertures in the platform below said reflectors, a cup and plunger adjustable to vary the effective depth of liquid therein, only one of said reflectors being in cooperation with said container, said cup and plunger being located in the aperture below the other reflector, and a removable casing on said platform enclosing the reflectors and liquid container.

12. In a color comparing device the combination with an eye piece, of a pair of reflectors for simultaneous cooperation with said eye piece, one of the reflectors being intermediate the other reflector and the eye piece, a liquid container between said reflectors, another liquid container below said first mentioned or intermediate reflector, and means for directing light rays through each of the liquid containers and into the eye piece, a support for said reflectors in which one of said reflectors is transversely adjustable.

STANLEY R. BENEDICT.
JOSEPH C. BOCK.